Nov. 27, 1962  J. J. SLOYAN  3,065,523

METHOD OF MANUFACTURING A MOTOR BASE

Filed Nov. 16, 1959

INVENTOR.
Jerome J. Sloyan
BY
Howard P. King
ATTORNEY

United States Patent Office 3,065,523
Patented Nov. 27, 1962

3,065,523
METHOD OF MANUFACTURING A MOTOR BASE
Jerome J. Sloyan, Trenton, N.J.
(% Automatic Motor Base Co., Windsor, N.J.)
Filed Nov. 16, 1959, Ser. No. 853,317
3 Claims. (Cl. 29—150)

This invention relates to supports, and more particularly to that type of support for motors or other machinery for providing a movable carriage by which the motor or the like has adjustable relation to some other instrumentality.

Various constructions of movable carriage mountings for motors and other machinery have heretofore been proposed and some have been produced. Cost of production of prior devices when manufactured with care and observing necessary close tolerances has been a deterrent in the more general adoption and use thereof. Simplicity of construction and reduction of labor costs in manufacture therefore assume great importance, and constitute a major object of the present invention. In addition to these requirements of simplicity of construction and rapidity and ease of assembly, the support must fulfill other demands of the trade, of which easy sliding, noiselessness, rigidity and compactness are of essential importance. The support of the present invention is made in recognition of the problems posed by these several requirements and demands, and by its construction and method of manufacture thereof, I have fulfilled the objectives of simplicity, ease of manufacture and low cost with all of the attributes above mentioned required to make it marketable and satisfactory to purchasers.

Expressed more specifically, and in reference to structural features, the invention provides a support in which a unitary base plate is utilized for mounting rails in parallel relation to each other.

In conjunction with the foregoing, another object is to provide mounting flanges as integral parts of said base and to assure exact parallelism thereof and exact parallelism and spacing of the rails.

An important object in attaining simplicity of construction and economy in manufacture is to avoid machining operations on the rails and flanges, such as prior practice of cutting shoulders and threads on the rail ends or boring holes in the flanges.

A further object for simplification of manufacture and assembly of the rails is to overcome the need for close tolerance of the length of said rails in formation thereof.

Special mention may be made of a realized objective by which a base plate of an initially flat blank character can be employed enabling all holes and slots to be performed on the blank in its flat state, both obtaining desired accuracy and rapidity of formation thereof.

Another accomplished feature of the invention is to utilize the punched base plate as its own jig for positioning and holding the rails while the rails are welded in place.

In accomplishment of progressive formation, assembly and unification of parts, the invention is directed to simple and effective method of fabrication productive of rigidly mounted rails placed and held in precise parallelism.

Other objects, advantages and features of structure and method will be recognized by persons skilled in the art to which the invention appertains as the description proceeds, both by direct recitation thereof and by implication from the context.

Referring to the accompanying drawing, in which like numerals of reference indicate similar parts throughout the several views.

Figure 1:
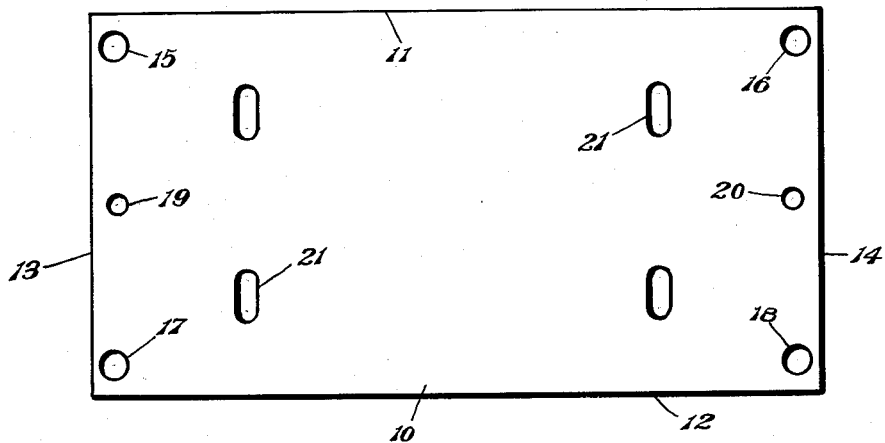
FIGURE 1 is a plan of the base plate blank in its initial flat condition after having been punched.
Figure 2:
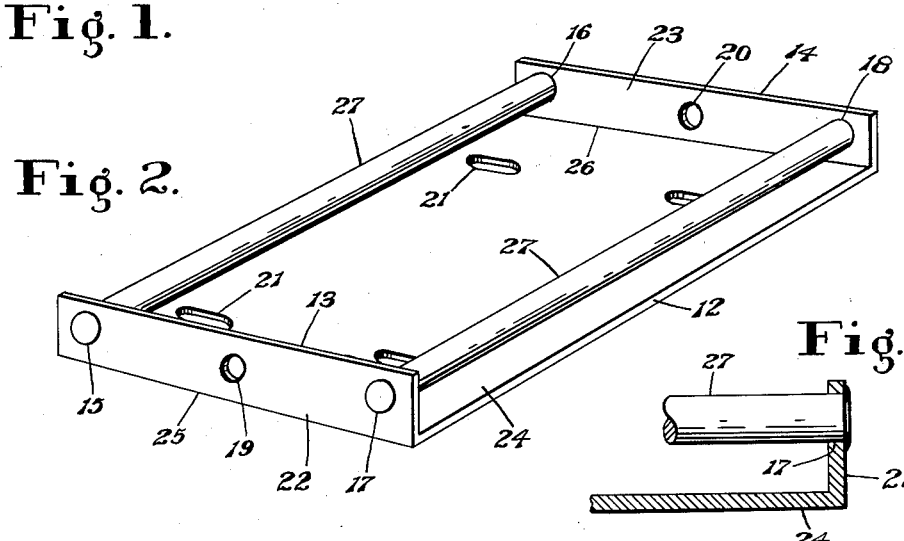
FIGURE 2 is a perspective view of the blank having end flanges bent to position, and showing rails slipped into position in the punched holes in said flanges.
Figure 3:
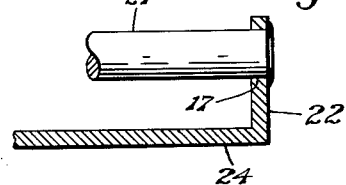
FIGURE 3 is a longitudinal sectional view of a part of the base plate, showing a corresponding part of one of the rails welded in place in the flange at the illustrated end of the base plate.
Figure 4:
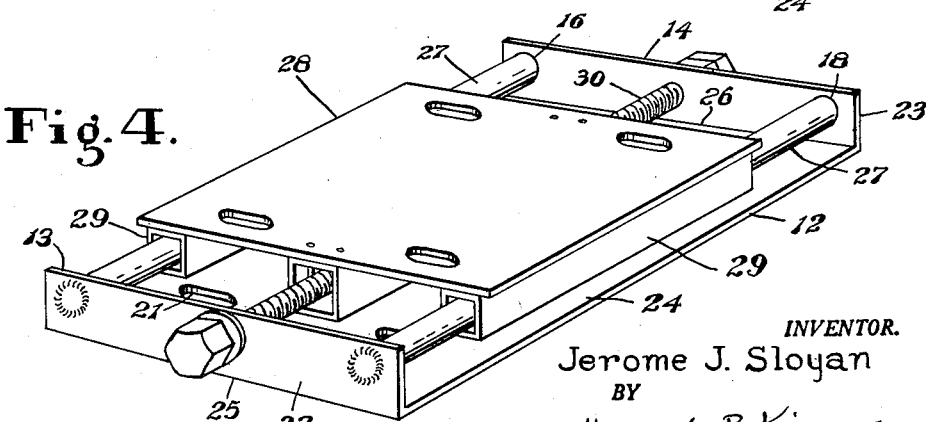
FIGURE 4 is a perspective view of the complete support ready for use.

Considering the invention initially in its general aspects of structure and mode of manufacture, a rectangular blank 10 is shown in FIG. 1 wherein, by definition, opposite edges are parallel and intersection of meeting edges form right angles. For descriptive and orienting purposes, the two longest edges will be arbitrarily designated as left and right edges 11 and 12 respectively, and the two shorter edges will designated front and rear edges respectively and identified with numerals 13 and 14. Proximate to each corner of the blank there is a punched hole, and for distinguishing purposes the one proximate to meeting edges 11 and 13 is identified by numeral 15, the one proximate to edges 11 and 14 by numeral 16, the one proximate to edges 12 and 13 by numeral 17, and the one proximate to edges 12 and 14 by numeral 18. All of these four holes 15, 16, 17 and 18 may conveniently be referred to as rail-receiving holes. Proximate to the front and rear edges 13 and 14 and midway between the two rail-receiving holes proximate to those respective edges, are two more punched holes 19 and 20 which will be referred to as the operating rod receiving holes. Furthermore, as here illustrated, other holes or slots 21 are punched in a more medial part of the blank 10 which may be used for lags or other means for ultimately securing the base to a supporting surface.

After the blank has been punched to provide the above-mentioned holes, the front and rear margins are bent to provide front and rear flanges 22 and 23 in planes parallel to each other and perpendicular to the plane of the general body portion of the blank, and as thus punched and bent, constitutes a unitary base 24. The lines of bending, designated with numerals 25 and 26 are parallel to each other and inwardly toward each other and inwardly from the respective holes proximate to the front and rear edges so that said holes are thereby located in the flanges 22 and 23 and with equal and appropriate spacing from the line of bend.

It can be here observed, that punching of the several holes may be accomplished with great accuracy, and likewise, by making the bends on a press brake, the flanges will have precise dimensions so that pairs of holes in opposite flanges will be in true alignment, and since the flanges are integral with the intervening flat portion of the body of the base, the alignment is immediately obtained and is permanent.

Rails 27 are located in aligned rail-receiving holes so as to bridge from one flange to the other, and by virtue of equal spacing and corresponding location of those holes in the respective flanges, said rails are thereby located in exact parallelism. The shape or contour of the rail-receiving holes is made to agree with the shape of the rails employed, and in the present showing, since cylindrical rods have been arbitrarily selected to constitute the rails, the rail-receiving holes are correspondingly circular. The rails are preferably just long enough so that their ends will be flush with the outer surfaces of the flanges, and when so located, at a proper stage of fabrication, are welded at their exposed ends to the flanges. Retention of the rails and support thereof in spaced relation to the body of the base is thus obtained, and at the same time, the rails afford a mutual retention of the flanges in their upright positions. Inasmuch as rails heretofore employed have been machined to provide outwardly directed shoulders for engagement against inner faces of bracket flanges and have had reduced threaded ends projecting through the flanges to receive nuts thereon, it will be seen that the present structure is not only more simplified, but is of superior character both from fabrication standpoint and as to ultimate result attained. All that is necessary is to cut the rails to proper length, that is all, and the length to which they are cut is not a matter of close tolerance; no shoulders and no threads are required and no nuts to pull the flanges out of parallelism. Welding of both ends of each rail to the flanges overcomes possibility of looseness of any rail end with its flange and consequently bracing of the flanges by both rails is assured.

Where a limited quantity of the devices are to be manufactured, an accurately punched and bent base plate can be made in successive operations and thereby save on the cost of more elaborate dies. To carry out this method, the original forming of the plate, by shearing or otherwise, should be carefully done to make it very close to the required dimensions and truly rectangular. A male and female die set would be made providing for punching the three holes next one end of the plate as well as the two slots nearest to that end. Stops would be provided in conjunction with the die-set to properly position the blank, for instance, the stops would be engaged by left side 11 and rear end 14 of the blank and holes 16, 18 and 20 and the two nearest slots 21 then punched by the die set. Thereafter the blank would be turned up-side-down, from front to back, so that left side 11 again engages the same stop it did before, but front end 13 engages the other stop that rear end 14 had previously engaged. Then the several holes and slots proximate to the front end of the blank are punched by the die-set. By this method, the holes in each end would be the same distance down from the top of the flanges when the flanges are bent up to form the completed base, and the spacing of the holes from one edge is precisely the same in each flange. Bending the flanges is performed on a press brake, first at one end of the blank and then at the other end, the ends being brought successively against the same stop so that the bends at opposite ends will be identical. The stop is, of course parallel to the intended line of bend so that the bend will consequently be parallel to the end edge that engages that stop. In this manner, the opposite rail-receiving holes in the opposite flanges are in axial alignment and the axes of the several said holes will lie in a common plane parallel to the body portion of the base plate. In use of this method, the ends of the blank are the primary means for locating both the holes and the bends. Should a blank happen to vary in length from a given standard, the distance between the flanges, and the distance between the slots, would vary accordingly. But the variation would not affect the height of the holes in the flanges in the least, and the rails when applied would consequently still be parallel to each other and to the body portion of the plate.

When quantity production warrants additional expense for more extensive die-sets, those sets can be made to punch all of the holes and slots simultaneously. One side and one end of the blank would be placed against appropriate stops so the punchings will be properly located. After the blank is punched, the flanges are bent up simultaneously by forcing the body portion of the blank into a female die of appropriate dimensions in conjunction with a corresponding male die. Instead of the ends and sides of the blank being used as locators, the slots in the body portion (which does not get bent) are employed as locators. Appropriate pins or lugs are provided projecting upwardly from the female die so as to enter said slots when the blank is positioned on the die thereby accurately locating the blank so it will be bent on the exact line where the bend is desired in relation to the location of the rail-receiving holes. The top of the body portion of the plate is engaged by the male die which forces the body portion downwardly into the female die and causing the ends of the blank to bend upwardly and form the flanges. The male die has a length equal to the desired distance between the lines of bend for the base plate and of course makes those bends parallel and equidistant from the proximate rail-receiving holes. The female die is made of appropriately greater length than the male die to accommodate the thickness of the material of the blank at both ends to permit the flange to stand upright at the ends of the male die as a result of the bending operation. In this method, the slots will be a predetermined distance apart; the flanges will be a predetermined distance apart; and the holes in each flange will be the same height from the body portion of the base. The bends will be square with respect to the holes and slots. If, perchance, the blanks vary in length, one flange will be higher than the other but without any functional detrimental effect. Also, if inadvertently the blank was not cut square, that discrepancy might be noticeable in the finished device, but as it would not affect the parallelism of the rails, the utility would be unimpaired.

The complete support of this invention includes an appropriate carriage 28 equipped with gliders 29 that ride on the rails 27. Inasmuch as the carriage construction here shown is not per se part of the present invention, but is fully shown and described in my prior Patent 2,874,006 dated February 17, 1959, reference may be had to that patent for any further description desired as to the construction and operation of the carriage. Suffice it to say, that before the rails are fully inserted in the base, the carriage is placed in position and the rails slid through the gliders and finally the rails are welded at their ends in the respective flanges 22, 23 of the base.

It is important to note that I utilize the base as its own jig for holding the rails during the welding operation. The preferred method of performing the welding of the rails in place, is to stand the assembled device on end on a bench or other supporting surface so that the bottom ends of the rails in that position engage the same surface supporting the under face of the flange, thereby positioning the ends of the rails flush with the proximate flange face. By so doing, the ends of the rails then located at the top end of the base will be substantially flush with what is then the top face of the upper flange. Welding of the upwardly directed ends of the rails to the flange thereat is then conveniently performed, after which the device is stood on its other end and the then upwardly directed ends of the rails are welded to the proximate flange. The adjusting screw 30 is preferably inserted through the flanges and carriage as a final step of assembly, so does not interfere with standing the device on end.

I claim:

1. A method of manufacture of base plates for supports of the character described, comprising punching holes successively in pairs proximate to opposite ends of a rectangular blank on lines parallel to each other through the centers of said holes gauged respectively from and proximate to opposite ends of said blank and both pairs gauged from the same side of the blank, and bending said blank on lines gauged from said respective ends and the same said side thereby forming said bends parallel to each other and parallel to said lines through the centers of the pairs of holes and also thereby forming flanges at opposite ends of the blank with each flange having a pair of holes centered equi-distant from said line of bend and the respective holes of the pairs of holes at the same distances from said side of the blank.

2. A method of manufacture of base plates for supports of the character described, comprising punching holes proximate to opposite ends and opposite sides of a rectangular blank with the holes at one end centered the same distance apart as the holes at the other end and on lines parallel to each other and the holes at one end being directly opposite the holes at the other end of said blank, and simultaneously punching other holes in duplicate in the blank closer to each other than said centering lines and with said duplicate other holes equi-distant respectively from the proximate centering line from which inwardly spaced, and bending said blank on lines parallel to each other and parallel to said centering lines and at locations respectively between said centering lines and proximate other holes, said bends being gauged in location in formation thereof by fixed location of said blank by said other holes and said bends being made to direct the end margins perpendicular to the body portion of said blank, whereby opposite holes in said margins are equidistant from said lines of bend and in respective axial alignment.

3. A method in accordance with claim 2, wherein rails are inserted at their opposite ends in opposite said holes and welded therein, and wherein welding of a first end of said rails is made with the rails upright and the second end resting on a surface flush with the under surface of the bent margin proximate to said second end.

References Cited in the file of this patent

UNITED STATES PATENTS

| | | |
|---|---|---|
| 1,216,430 | Forsyth | Feb. 20, 1917 |
| 2,610,587 | Pietzsch | Sept. 16, 1952 |
| 2,662,988 | McKim | Dec. 15, 1953 |
| 2,874,006 | Sloyan | Feb. 17, 1959 |

FOREIGN PATENTS

| | | |
|---|---|---|
| 612,508 | Great Britain | Nov. 15, 1948 |